United States Patent [19]

Mody et al.

[11] Patent Number: 5,667,711
[45] Date of Patent: Sep. 16, 1997

[54] CIRCUIT BREAKER INCORPORATING TRIP COIL AS SHUNT RESISTOR IN PARALLEL WITH CURRENT LIMITING POLYMER

[75] Inventors: Hemant K. Mody, Brookfield; William E. Grass, Sussex, both of Wis.

[73] Assignee: Eaton Corporation, Cleveland, Ohio

[21] Appl. No.: 650,199

[22] Filed: May 20, 1996

[51] Int. Cl.$^6$ ........................................ H05B 1/02
[52] U.S. Cl. ..................... 219/505; 219/481; 219/514; 219/504
[58] Field of Search ........................ 219/504, 505, 219/481, 514, 497, 501, 491, 502; 338/22 R

[56] References Cited

U.S. PATENT DOCUMENTS

| | | | |
|---|---|---|---|
| 4,321,447 | 3/1982 | Lamb | 219/505 |
| 4,886,955 | 12/1989 | Kimura | 219/494 |
| 5,471,035 | 11/1995 | Holmes | 219/505 |
| 5,493,101 | 2/1996 | Innes | 219/502 |

Primary Examiner—Mark H. Paschall
Attorney, Agent, or Firm—Larry G. Vandezande

[57] ABSTRACT

A solenoid trip unit is electrically connected in parallel with a current limiting polymer element in series with circuit breaker contacts to function as a shunt resistance for the polymer element, becoming energized by transition of the polymer element to its high resistive state, for tripping the breaker contacts open upon such transition. The solenoid may be particularly wound with a resistive wire.

7 Claims, 1 Drawing Sheet

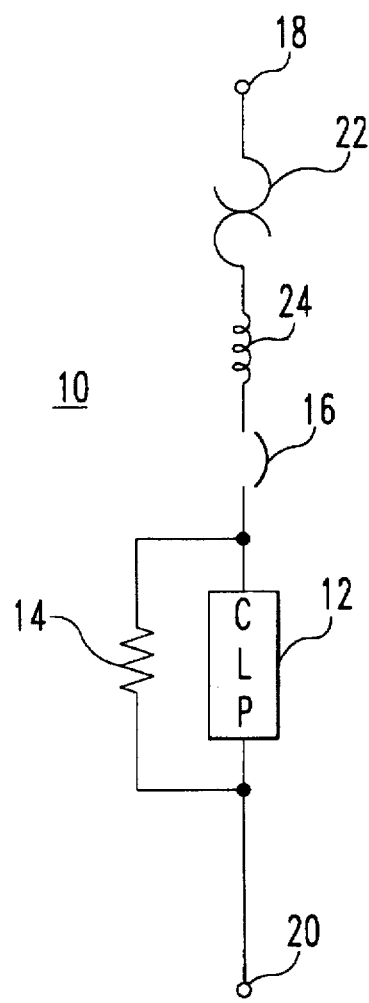
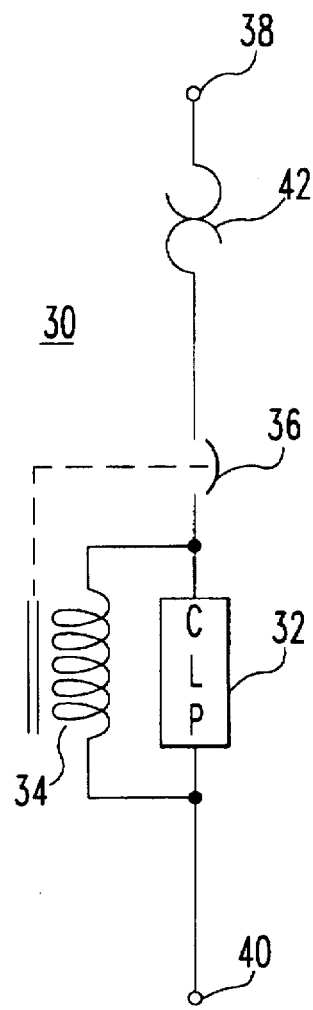
FIG.1
PRIOR ART
FIG.2

CIRCUIT BREAKER INCORPORATING TRIP COIL AS SHUNT RESISTOR IN PARALLEL WITH CURRENT LIMITING POLYMER

BACKGROUND OF THE INVENTION

This invention relates to overcurrent circuit protecting apparatus such as circuit breakers, and more particularly to circuit breakers which are current limiting, i.e. they limit peak let-through current of short circuit fault currents to a value which should not damage the load.

It is known to use positive temperature coefficient (PTC) resistive elements in circuit breakers for limiting fault current flowing through the circuit breaker. Current limiting polymer (CLP) materials exhibit PTC qualities. When connected in circuit with the circuit breaker contacts, the CLP material responds to heat caused by fault currents flowing in the breaker to substantially increase the electrical resistance of the CLP element. The resistance can rise approximately two orders of magnitude to sufficiently reduce current flow through the CLP element. The CLP material alone may be unable to absorb all of the energy of fault currents and therefore it is also known to place a shunt resistor in parallel with the CLP element. The change in resistance of the CLP element causes the current to shift from the CLP element to the parallel shunt resistor, which absorbs part of the energy and helps the circuit breaker interrupt the current flow with lower let-through current and energy.

SUMMARY OF THE INVENTION

This invention provides a current limiting circuit breaker having a parallel combination of a current limiting polymer and a shunt resistance in series with the circuit breaker contacts wherein the shunt resistance comprises a solenoid trip element. This invention reduces the part count, lowers the space requirement of the circuit breaker elements within the breaker housing, and provides inherent coordination between the current limiting polymer/shunt resistance circuit and the circuit breaker contacts by tripping the circuit breaker as a result of the current limiting polymer transitioning to a high resistive state and directing current through the trip solenoid (shunt resistance). The solenoid of the circuit breaker trip mechanism may be particularly wound with a resistive wire to function as the shunt resistor.

The invention and its advantages will become more readily apparent when reading the following description and claims in conjunction with the accompanying drawings.

BRIEF DESCRIPTION OF THE DRAWINGS

FIG. 1 is a schematic representation of a known current limiting circuit breaker having a parallel combination of a current limiting polymer and shunt resistor connected in series with the circuit breaker contacts, and FIG. 2 is a schematic representation of the improved current limiting circuit breaker constructed in accordance with this invention.

DETAILED DESCRIPTION OF THE PREFERRED EMBODIMENT

Referring particularly to FIG. 1, a known current limiting circuit breaker arrangement comprises a circuit breaker 10 having a parallel connected current limiting polymer element 12 and shunt resistor 14 connected in series with breaker contacts 16 between line and load terminals 18 and 20, respectively. Circuit breaker 10 comprises a thermal magnetic current sensing and trip mechanism comprising a bimetal element 22 and an electromagnetic winding 24. Although not specifically illustrated in the schematic diagram of FIG. 1, the circuit breaker contacts 16 are biased to an OPEN position and are manually operable between the OPEN and ON position by an operating mechanism, which includes a latch mechanism to maintain the contacts 16 closed when the breaker is operated to its ON position. The latch mechanism includes mechanical interconnections to the thermal trip element 22 and the electromagnetic trip element 24 for operating the latch to a trip position in response to operation of either of the elements 22 or 24.

Under normal operating conditions, current limiting polymer element 12 provides very low resistance and substantially all of the current flowing through circuit breaker 10 flows through the CLP element 12. An increase in current flowing through the circuit breaker will raise the temperature of the CLP element 12 which in turn increases its resistance. A significant increase in current through the breaker, such as caused by a short circuit fault current, causes the temperature and the resistance of the current limiting polymer element 12 to increase markedly, approximately two orders of magnitude, thereby causing a majority of the current to flow through the shunt resistor 14. The same fault current flows through the thermal trip element 22 and the magnetic trip element 24. A high short circuit fault current will cause the electromagnetic trip mechanism to operate, tripping the latch mechanism and releasing the contacts 16. The resistor 14 aids in interruption of the circuit by the circuit breaker by absorbing some of the energy in the fault. However, there is no direct correlation between the transition of current limiting polymer element 12 to its high resistance state and the operation of electromagnetic trip mechanism 24. It is desirable to achieve separation of the contacts 16 at the time that the current limiting polymer element 12 transitions to prevent potentially damaging let-through current from passing to the load through shunt resistor 14.

Referring to FIG. 2, a circuit breaker 30 constructed in accordance with this invention is illustrated. Circuit breaker 30 comprises a current limiting polymer element 32 and a parallel connected shunt resistance connected in series with breaker contacts 36 between line and load terminals 38 and 40, respectively. The magnetic trip function of circuit breaker 30 is provided by a solenoid trip unit wherein the solenoid 34 is connected in parallel with CLP element 32 as the shunt resistance. The solenoid 34 may be particularly wound of a resistive wire to achieve the desired resistance qualities. Solenoid 34 is the magnetic trip element for circuit breaker 30, replacing the separate magnetic trip member 24 in FIG. 1. In operation, current primarily flows through CLP element 32 in the low resistive state thereof. A high short circuit fault current will effect the heating of CLP element 32 resulting in a transition of that element to its high resistive state, effectively blocking current flow therethrough. This transition causes current to flow through solenoid 34, energizing the solenoid to trip the breaker contacts 36 open.

This invention provides several advantages over the known circuit breaker 10. It reduces the part count of circuit breaker 30 by eliminating the separate shunt resistor 14 and magnetic trip member 24 of FIG. 1 and replacing them with the solenoid 34 of a solenoid trip. The invention inherently effects coordination between the circuit breaker contacts 36 and the transition of current limiting polymer element 32 inasmuch as the transition of element 32 to a high resistive state causes current to flow in the solenoid 34 which energizes the coil and in turn trips the breaker contacts 36. The elimination of the resistor 14 reduces the space requirement for this element in the circuit breaker housing. Moreover, the connection for solenoid 34 has current flowing in the solenoid only during the time the CLP element 32 transitions, i.e., only during short circuit conditions. Thus, heat normally generated in a trip solenoid by current constantly flowing therethrough is not present and does not have to be dissipated.

Although a single preferred embodiment of the current limiting circuit breaker of this invention has been disclosed hereinabove, it is to be understood that the invention is susceptible of various modifications without departing from the scope of the appended claims.

We claim:

1. An electrical circuit breaker comprising contacts latched in a closed position and biased to an open position, current responsive trip means connected in circuit with said contacts operable for releasing said latched contacts in response to a current level through said contacts exceeding a predetermined threshold value, and a current limiting conductive polymer element connected in series with said contacts, said trip means comprising a solenoid connected directly in parallel with said conductive polymer element, said solenoid providing a shunt resistance for said conductive polymer element.

2. The electrical circuit breaker as defined in claim 1 wherein said solenoid is wound with a resistive wire.

3. The electrical circuit breaker as defined in claim 2 wherein resistance of said solenoid adds series impedance in circuit with said contacts for assisting interruption of current by said contacts.

4. The electrical circuit breaker as defined in claim 1 wherein transition of said conductive polymer element to a high resistance state effects energization of said solenoid and tripping of said circuit breaker.

5. An electrical circuit breaker comprising contacts biased to an open position and operable to a latched closed position, a positive temperature coefficient conductive polymer element connected in series with said contacts, and a shunt resistance connected directly in parallel with said conductive polymer element, said shunt resistance comprising a trip solenoid operable in response to a current level through said contacts exceeding a predetermined threshold value for unlatching said circuit breaker contacts.

6. The electrical circuit breaker as defined in claim 5 wherein said solenoid comprises a resistive wire.

7. Electrical circuit protection apparatus comprising contacts operable between open and closed positions, means biasing said contacts to said open position, latch means operable for holding said contacts in said closed position, a current limiting conductive polymer element connected in series with said contacts, and a current responsive solenoid for tripping said latch means in response to current level in said contacts exceeding a predetermined threshold value, said solenoid connected directly in parallel with said conductive polymer element as a shunt resistance.

* * * * *